US010692120B2

(12) United States Patent
Gupta et al.

(10) Patent No.: US 10,692,120 B2
(45) Date of Patent: Jun. 23, 2020

(54) SYSTEM, METHOD, AND COMPUTER-READABLE STORAGE MEDIUM FOR DETERMINING A TRUST CIRCLE THROUGH MACHINE LEARNING

(71) Applicant: SAP SE, Walldorf (DE)

(72) Inventors: Vikas Gupta, Jaipur (IN); Shruti Hansoge Ramesh, Bangalore (IN); Aby Jose, Kottayam (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/362,740

(22) Filed: Nov. 28, 2016

(65) Prior Publication Data

US 2018/0150890 A1      May 31, 2018

(51) Int. Cl.
*G06Q 30/06* (2012.01)
*G06N 5/02* (2006.01)
*G06N 20/00* (2019.01)
*G06Q 50/00* (2012.01)
*G06Q 30/02* (2012.01)

(52) U.S. Cl.
CPC ........... *G06Q 30/0609* (2013.01); *G06N 5/02* (2013.01); *G06N 20/00* (2019.01); *G06Q 30/0269* (2013.01); *G06Q 50/01* (2013.01)

(58) Field of Classification Search
CPC .................................................. G06Q 30/0609
See application file for complete search history.

(56) References Cited

U.S. PATENT DOCUMENTS

| 8,650,622 | B2* | 2/2014 | Murakami | ............ H04W 12/08 705/26.1 |
| 10,127,316 | B2* | 11/2018 | Lee-Goldman | ....... G06F 16/951 |
| 2013/0014222 | A1* | 1/2013 | Bhatia | .................. H04N 21/252 726/4 |
| 2013/0041916 | A1* | 2/2013 | Biesecker | .............. G06Q 10/10 707/769 |

(Continued)

OTHER PUBLICATIONS

Jessica Rivero et al. "Using the ACO algorithm for path searches in social networks" Springer Science+Business Media Jun. 10, 2011 (Year: 2011).*

*Primary Examiner* — Michael Misiaszek
*Assistant Examiner* — Jason B Warren
(74) *Attorney, Agent, or Firm* — Buckley, Maschoff & Talwalkar LLC

(57) ABSTRACT

Various embodiments of systems and methods for trust circle through machine learning are described herein. The method includes identifying a website subscribed with the trust circle for aggregating data based upon a query. The query is received from a user of one or more registered users of the subscribed website. The one or more users' information and their respective authentication token is retrieved from the subscribed website. Based upon the authentication token of the respective user, information of the respective user is retrieved from one or more social media websites. The retrieved one or more users information and their retrieved one or more social media websites information is correlated to generate an output based upon the query. The output comprises reviews by the one or more users as reviewers, relationship of the reviewers with the user raised the query, and ratings clustered based upon various parameters.

20 Claims, 7 Drawing Sheets

(56) References Cited

U.S. PATENT DOCUMENTS

| | | | |
|---|---|---|---|
| 2015/0106371 A1* | 4/2015 | Shah | G06Q 50/01 |
| | | | 707/736 |
| 2015/0294377 A1* | 10/2015 | Chow | G06Q 30/0263 |
| | | | 705/347 |
| 2015/0294378 A1* | 10/2015 | Liu | G06Q 30/0282 |
| | | | 705/26.61 |
| 2017/0116339 A1* | 4/2017 | Stein | G06F 16/9535 |

* cited by examiner

SYSTEM, METHOD, AND COMPUTER-READABLE STORAGE MEDIUM FOR DETERMINING A TRUST CIRCLE THROUGH MACHINE LEARNING

BACKGROUND

Data gathering plays a vital role in today's economy. Data gathering may comprise collecting feedback, reviews, rating, and replies related to various queries, objects, products, and services, etc. Various platforms (e.g., forums, portals, and websites, etc.) provide data related to various queries, objects, products, and services, etc. These platforms utilize multiple channels for gathering and providing data. These data play a vital role because users rely on these data to make various decisions, e.g., decision related to purchase. However, as there are several platforms and channels, these data are voluminous and scattered. A user needs to spend lots of time and effort to collect, gather, and compile these data, e.g., to make decisions. Further, it might be difficult to rely on these data as a source of data or data source (e.g., reviewer providing ratings for a product) may be unknown and not trustworthy. Usually, the data appears untrustworthy as the connection or relationship with the data source or data supplier (e.g., reviewer) is unknown. Some measures are known in the art to validate the data source or reviewer (e.g., using user social media account, ID proof, or purchase proof, etc., of the reviewer or data source), however, these measure can easily be forged or tampered. Therefore, there are trust issues and it is difficult to make purchase decisions which negatively affects sales and service providers.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Figure 1:
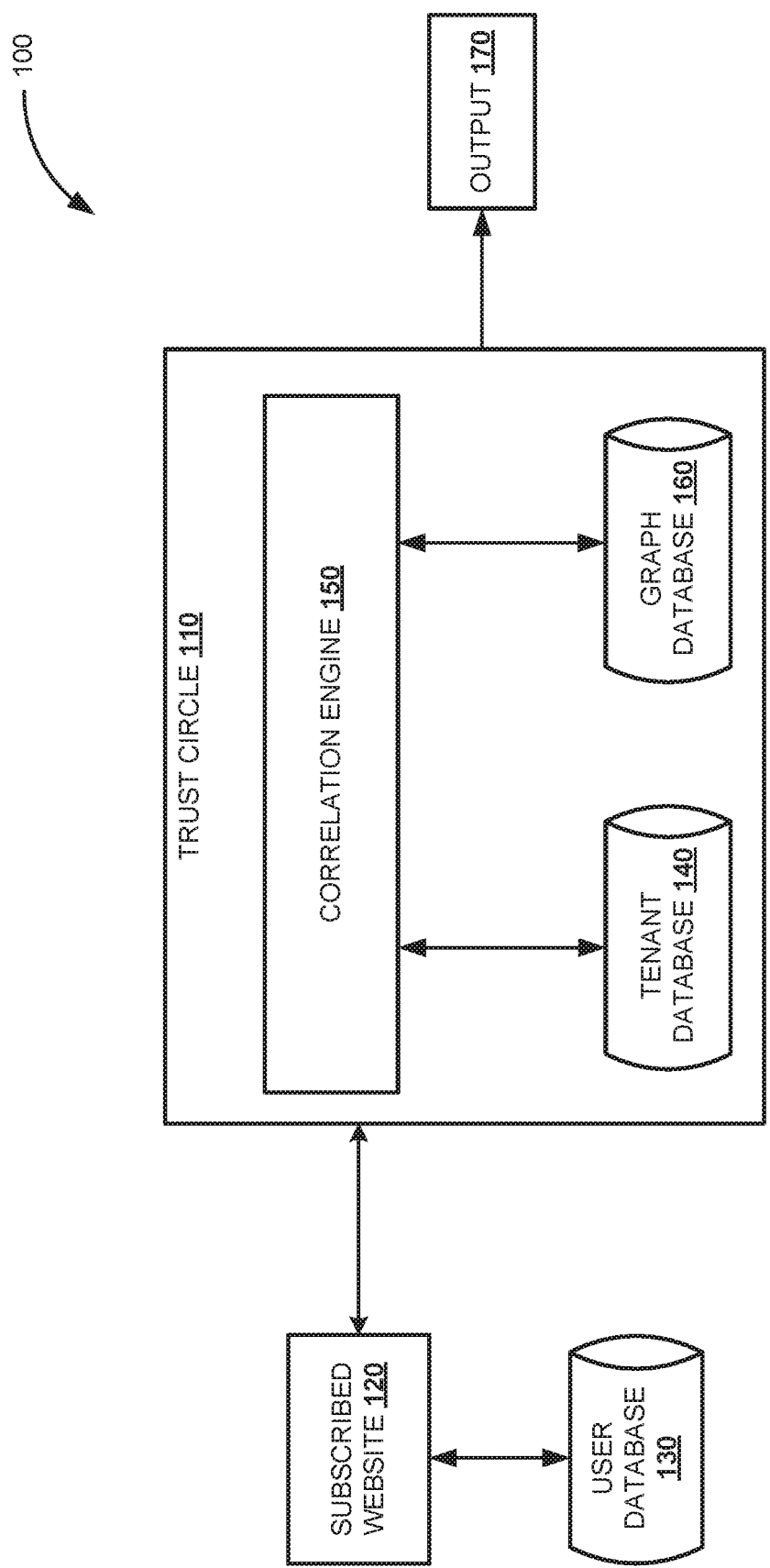
FIG. 1 is a block diagram illustrating various components for aggregating data through trust circle, according to an embodiment.

Embodiments of techniques for trust circle through machine learning are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Machine learning" refers to a machine's ability to learn without being programmed. The machine learning allows a machine to automatically analyze data and build analytical model. Machine learning uses various algorithms that iteratively learn from data. The machine learning allows machine to determine hidden insights without being explicitly programmed. For example, through machine learning, the machine may itself analyze connections between various users through their social media websites (connections) and may generate relation between users. The relationship between users may be direct or one-to-one or may be indirect, e.g., through one or more common connections. Through machine learning, the machine may be able to determine the direct and indirect relation between users by analyzing their social media websites and connections.

"Authentication token" or "OAuth token" refers to an open standard for authorization, used for internet users, to authorize third-party to access their server resources (e.g., social media account) without sharing their credentials (e.g., log in details or password). OAuth token provides a "secure delegated access" to server resources on behalf of a resource owner or user. In an embodiment, an OAuth token may be generated when a user approves to share or let a third party (e.g., an ecommerce website) access its information (e.g., social media websites information) without sharing or exposing their credentials. The OAuth token is generated by the social media websites once the user permission to share the social media websites information is received by the social media websites. The generated OAuth token is provided to the third party or e-commerce websites (e.g., Flipcart®, Amazon®, etc.) to enable them to access and/or retrieve user's information from the user's social media websites account (Facebook®, Twitter®, etc.).

"Aggregated data" refers to an information gathered and expressed in a summary form, e.g., for purposes of statistical analysis. Data aggregation may be to get more insight or information (e.g., rating, reviews, etc.) about particular product/service. The aggregated data may be segregated or clustered based on one or more parameters, such as, age, hobby, profession, gender, and trend, etc. The aggregated data may also include data sources details, i.e., sources from where data is collected and the relationship or connection of the data sources with a user requesting the aggregated data. The aggregated data may also include names of various social and/or professional websites through the user and the data sources are connected. Therefore, the aggregated data may be more reliable and trust-worthy.

"Trust circle" refers to a software module hosted on cloud to provide trustworthy aggregated data based upon a query. The trust circle may include components for collecting information from various sources (e.g., websites) and correlating the collected information, based upon the query, to generate output comprising aggregated data.

FIG. 1 is a block diagram illustrating exemplary system 100 for data aggregation through trust circle 110, according to an embodiment. The trust circle 110 may be provided as a plug-in to websites (e.g., an ecommerce websites). In an embodiment, the trust circle 110 may be on cloud (Hana® cloud platform or HCP) and can be accessed by websites. The websites need to be subscribed or registered with the trust circle 110 to consume the services provided by the trust circle 110, e.g., to provide trusted and relevant data (e.g., reviews and ratings related to any product or service) to its users. Subscribed website 120 may be any website launched for ecommerce, e.g., buying/selling product or services. The subscribed website 120 maintains information of its registered users, e.g., in user database 130. The user database 130 may include users' information such as user's name, sex, address, location, phone number, etc. Once the website is registered or subscribed with the trust circle 110 (i.e., subscribed website 120), the trust circle 110 creates tenant database 140 corresponding to the subscribed website, i.e., the subscribed website 120. The information from the user database 130 of the subscribed website 120 may then be copied to the tenant database 140, i.e., the trust circle 110 retrieves or copies users information from the subscribed website 120 and stores it in the tenant database 140. In an embodiment, the users may be inquired (e.g., through a pop-up option) to check whether the users approve to share their information, e.g., from their social media websites. When they approves, the user's information may be accessed or retrieved from the user database 130 of the subscribed website 120 and copied to the tenant database 140. In an embodiment, once the user approves to share its information, the subscribed website 120 sends the approval to the social media websites and receives an authentication token (OAuth token) of the user from the social media websites. The received OAuth token may also be sent to the trust circle 110 and stored in the tenant database 140. In an embodiment, the trust circle 110 includes a monitoring unit (not shown) to constantly monitor the user database 130 of the subscribed website 120 for any change. If there are any change(s) in the user database 130, the tenant database 140 is updated accordingly.

The trust circle 110 identifies a query from a user of the subscribed website 120. The trust circle 110 retrieves the user's information from the tenant database 140. In an embodiment, the tenant database 140 is read by correlation engine 150. The correlation engine 150 reads the authentication token of each of the respective registered users of the subscribed website 120 and using the authentication token, retrieves the users' information (e.g., contacts or connections) from the social media or networking websites (e.g., Facebook®, Twitter®, Instagram®, etc.). Based upon the users' information (e.g., users' connections) from the social media websites, the correlation engine 150 generates graph database 160 illustrating connection or relationship between the users. The graph database 160 includes users information (e.g., as nodes) and connection between different users (e.g., as edges). In an embodiment, the graph database 160 is stored or handed over to the subscribed website 120. Based upon the graph database 160 and the query, an output 170 may be generated by the trust circle 110. The output 170 is sent to the subscribed website 120 and the subscribed website 120 displays the output 170 to the user from whom query is received. The output 170 may include aggregated data (e.g., data, reviews, rating, etc., related to the product or service specified in the query) as well as connection or relationship of the user that raised the query with the respective data source (other users as reviewers). In an embodiment, if there is no connection (neither direct nor indirect) between the user that raised the query and the data source (e.g., reviewer), then 'not connected' message is displayed. The output 170 may also include data (e.g., ratings and/or reviews) segregated or clustered based upon various parameters such as age, interests, geography, location, gender, etc., of the data sources (e.g., reviewers).

Aggregated data plays a vital role in decision making. For example, aggregated data may help in consulting, e.g., for buying and/or selling product and/or services. Various websites (e.g., ecommerce websites) provide merchandize or shopping options online, e.g., Flipcart®, Amazon®, etc. These websites provide options to users to subscribe or register with the websites so that the users may not be required to enter or provide data each time they make any transaction, e.g., purchase, and to be informed about the offers etc. The website maintains or stores data related to their registered users. The data related to the registered users may be maintained or stored in a user database (e.g., the user database 130 of FIG. 1). A user's data may include user's name, gender, age, phone number, address, hobbies, location, etc. The user database may be maintained and kept secured by the website. An exemplarily user database 130 may be as shown below (assuming five registered users ABC, XYZ, MNO, SRQ, and PXR):

| USER_ID | NAME | AGE | GENDER | PHONE NUMBER | ADDRESS | HOBBIES | PERMISSION |
|---|---|---|---|---|---|---|---|
| 001 | ABC | 42 | FEMALE | 9674356650 | abc . . . | READING | YES |
| 002 | XYZ | 56 | MALE | 8876463219 | xyz . . . | PLAYING GUITAR | NO |
| 003 | MNO | 23 | MALE | 8762938123 | mno . . . | READING | YES |
| 004 | SRQ | 21 | MALE | 7865342910 | srq . . . | SINGING | YES |
| 005 | PXR | 59 | FEMALE | 8863921863 | pxr . . . | COOKING | YES |

In an embodiment, at the time of registering a user, a website may take user's permission (e.g., through a pop-up) whether to share or access its information (e.g., information from social media websites or other websites) for consultancy or other service. If the user allows to access or share their information, the subscribed website sends approval or permission to the social media websites and receives a permission token (e.g., OAuth token) from the social media websites. The OAuth token is stored with corresponding user's information in the user database. In order to provide reliable and trustworthy data aggregation or consultancy (review, rating, feedback, etc.) to the users, the website subscribes or registers with the trust circle 110 (FIG. 1). The trust circle 110 is provided as a service or a plug-in to the existing websites. In an embodiment, the trust circle 110 may be provided as a service on HANA® cloud platform (HCP). When the website is subscribed to the trust circle 110, the website can utilize the service provided by the trust circle 110 (e.g., to provide trustworthy reviews or rating, etc., to the users). Once the website is subscribed to the trust circle 110, the trust circle 110 creates a tenant database (e.g., the tenant database 140 of FIG. 1) corresponding to the subscribed website (e.g., the subscribed website 120 of FIG. 1). The tenant database 140 is dedicated for serving the corresponding subscribed website 120. In an embodiment, the tenant database 140 may be termed as an intermediate database.

Once the tenant database 140 is created, the trust circle 110 copies the users' information from the user database 130 into the tenant database 140. Typically, the users who have given permission or allowed sharing of information, their information is copied from the user database 130 into the tenant database 140. For example, if the users ABC, MNO, SRQ, and PXR have allowed to share their information and user XYZ has declined to share his information, then only the information of the users ABC, MNO, SRQ, and PXR are copied into the tenant database 140 and the information of the user XYZ is not copied to the tenant database 140. In an embodiment, the trust circle 110 reads "permission" field of the user database 130 and when the "permission" field value is 'YES,' then that user's data is copied into the tenant database 140. In an embodiment, the OAuth token of the users whose "permission" field value is "YES" is also stored in the user database 130. In an embodiment, the subscribed website also sends permission token (e.g., OAuth token) of respective users to the trust circle 110 to be stored in the tenant database 140. In an embodiment, the trust circle 110 includes an interface (application programming interface or API to receive users data and OAuth token of the respective user. In an embodiment, there may be a message queue to store the received users data and OAuth tokens before transferring it to the tenant database 140. An exemplarily tenant database 140 may store information as shown below:

310-330 and other sources 340) to extract users' information such as users' friend_list, connections, etc. In an embodiment, the correlation engine 150 includes an interface or application programming interface (API) (not shown) though which it retrieves the users' information from social media websites using OAuth token of the respective user.

Upon extracting users' information (friend_list, connections, etc.) from the social media websites 310-330 and other resources 340, the correlation engine 150 determines relationship between users, i.e., whether they are connected directly or indirectly (i.e., through other users) on any of the social media websites 310-330 and/or other resources 340. Based upon the determination, the correlation engine 150 generates the graph database 160. The graph database 160 stores the users information as nodes and connection between users as edges. An exemplarily information stored in the graph database 160 may be as shown below:

| NODES | EDGES |
|---|---|
| ABC, MNO, SRQ, PXR | (ABC, MNO), (ABC, SRQ), (PXR, MNO) |

Figure 4:
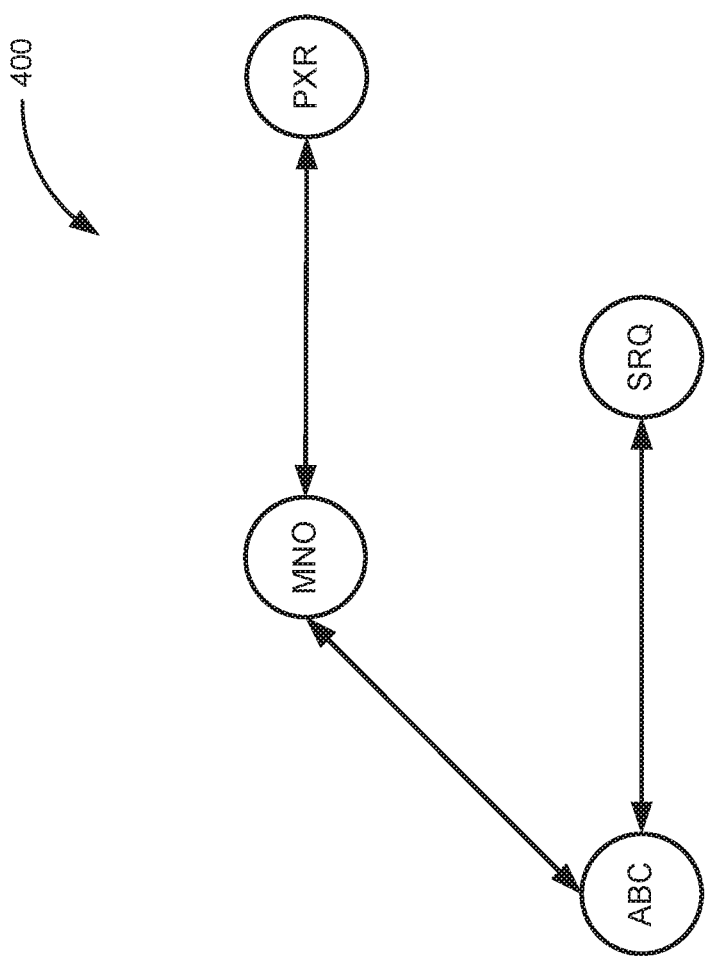
FIG. 4 illustrates a networked graph generated based upon input from the graph database, according to an embodiment.

The correlation engine 150 generates a graph based upon the graph database 160. In an embodiment, the graph may be termed as a networked graph which displays connection or relationship between the users. FIG. 4 illustrates a networked graph 400 generated by the correlation engine 150, based upon the information from the above graph database. As shown in the FIG. 4, the networked graph 400 includes nodes ABC, MNO, SRQ, and PXR. Each node indicates a user and includes the information related to that user. For example, node ABC may include data related to the user

| USER_ID | NAME | AGE | GENDER | PHONE NUMBER | ADDRESS | HOBBIES | OAuth TOKEN |
|---|---|---|---|---|---|---|---|
| 001 | ABC | 42 | FEMALE | 9674356650 | abc . . . | READING | 187699 |
| 003 | MNO | 23 | MALE | 8762938123 | mno . . . | READING | 976345 |
| 004 | SRQ | 21 | MALE | 7865342910 | srq . . . | SINGING | 975461 |
| 005 | PXR | 59 | FEMALE | 8863921863 | pxr . . . | COOKING | 885324 |

Figure 2:
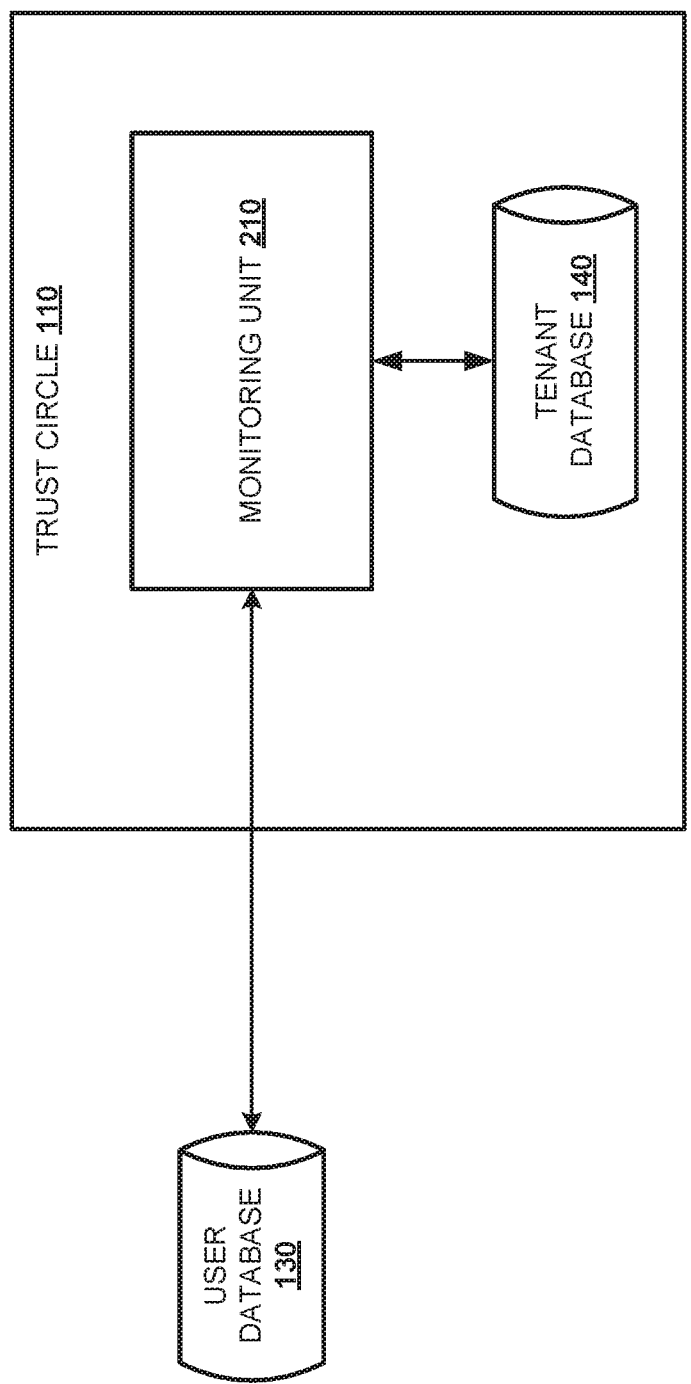
FIG. 2 is a block diagram illustrating a monitoring unit within the trust circle to monitor a user database of a subscribed website, according to an embodiment.

In an embodiment, the trust circle 110 includes a monitoring unit (not shown) to constantly (e.g., in real time or at a predefined time interval) monitor the user database 130 for any modification or changes to update the tenant database 140 accordingly. FIG. 2 illustrates the trust circle 110 including monitoring unit 210 to monitor the user database 130. If there is any change in the user database 130 (e.g., if any new user is added or any change in the information of the existing users, etc.) the monitoring unit 210 updates the tenant database 140 accordingly.

Once the tenant database 140 is updated, the correlation engine 150 reads the user information, including OAuth token of the users, from the tenant database 140. The OAuth token is used to retrieve users' information from the social media websites.

Figure 3:
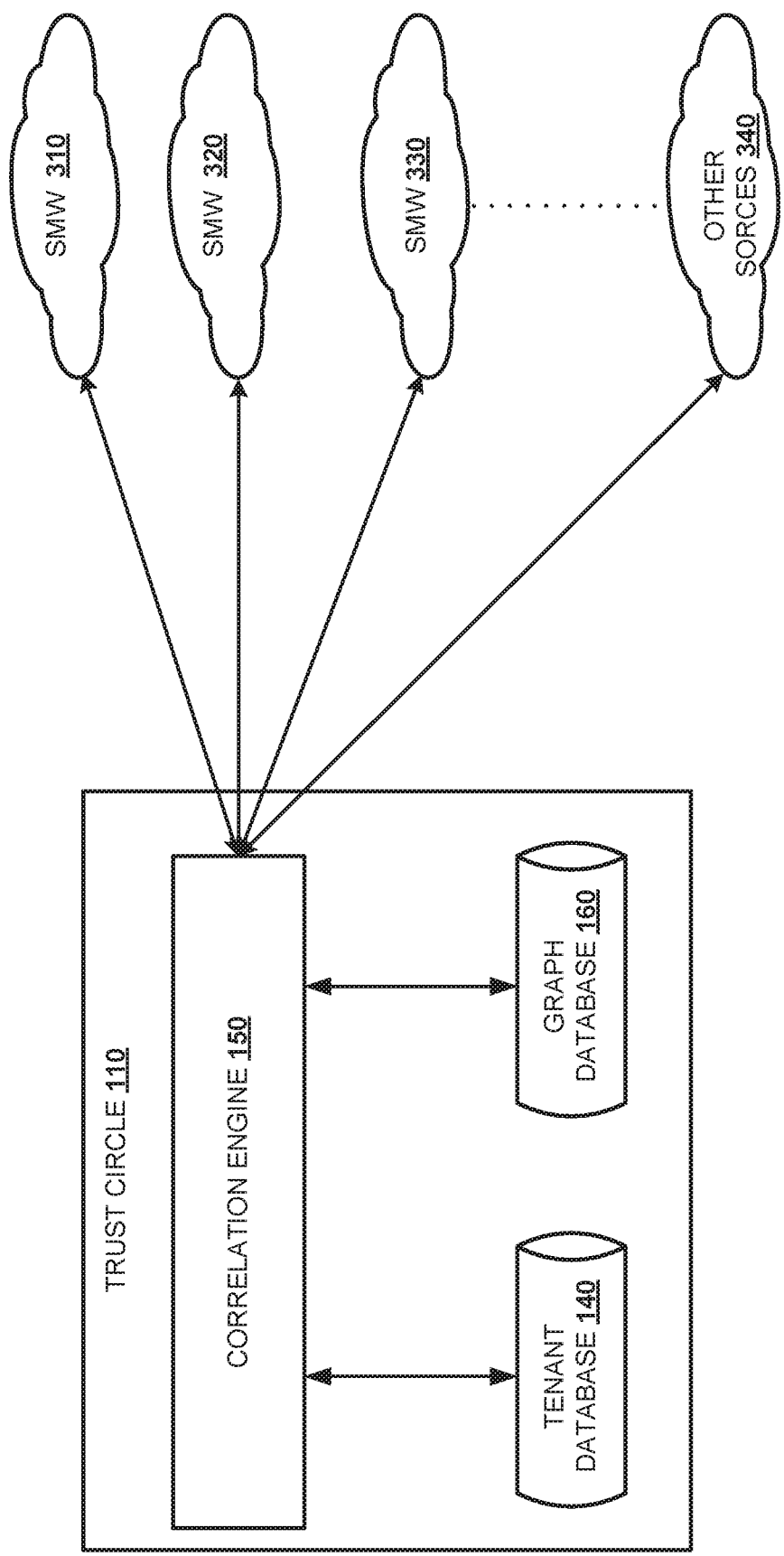
FIG. 3 is a block diagram illustrating a process to extract information from social media websites to generate a graph database, according to an embodiment.

FIG. 3 is a block diagram illustrating a process to extract users' information from social media websites such as social media website (SMW) 310, SMW 320, SMW 330, and other resources 340. The users' information may be extracted from the social media websites SMW 310-330 and other resources 340, e.g., using OAuth token of the respective users. The correlation engine 150 reads the OAuth token of the respective users from the tenant database 140. Using the OAuth token of the respective user, the correlation engine 150 sends request to the social media websites (e.g., SMW ABC such as name, age, hobbies, address, phone number, etc., of the user ABC. The connection or relationship between users are shown by edges. As shown, edge (ABC, MNO) indicates that there is a direct relation or edge between node ABC and MNO. In an embodiment, the edge may also store name of social media website(s) through which the connection or relationship between nodes exist, e.g., (ABC, MNO: Facebook®). As shown in the networked graph 400, there is edge or direct connection between {ABC and MNO}, {ABC and SRQ}, and {MNO and PXR}. However, {MNO and SRQ} are indirectly connected through ABC and {PXR and ABC} are indirectly connected through MNO. In an embodiment, the correlation engine 150 may maintain 'level of connection' between users. For example, when users are directly connected on one-to-one, then it may be referred as 'level 1' connection, whereas when users are connected indirectly through another user, it may be referred as 'level 2' connection. When there are two users in between or connecting the users, it's referred as 'level 3' connection and the like.

Correlation engine 150 includes machine learning algorithms (e.g., K-nearest neighbors or KNN algorithm) to automatically learn and generate the networked graph, e.g., with new connections or updated connections between users based on real-time data update the networked graph. Typically, the tenant database 140 is updated based upon the change in the user database 130 and the graph database 160 is updated according to the change in the tenant database 140. When a new user is added, the correlation engine 150 determines the relationship or connection of the new user with the other existing users (e.g., through social media websites). Based upon the determination, the correlation engine 150 updates the graph database 160.

In an embodiment, the changes (e.g., new user, new data, etc.) may be indexed and stored in the graph database 160. The indexed or new data are provided to machine learning module (not shown) within the correlation engine 150. In an embodiment, the machine learning enables generating pattern by connecting related information, e.g., by connecting new user with other existing users, etc. In an embodiment, the pattern is continuously updated with new learning or new data. In an embodiment, the non-related or non-connected users or data may be stored as a new pattern. The existing data or users information is refined or updated in real time (e.g., by adding new connections or updating existing connections), based upon change in the user database 130 and change in the users' connections on social media websites.

In an embodiment, the correlation engine 150 (e.g., using predictive analysis library (PAL) algorithm) correlates data. Data correlation enables: (i) providing filtering capabilities to the users to filter the aggregated data (e.g., rating, reviews, feedback, etc.) based upon parameters such as location, most recent review, etc.; and (ii) providing clustering feature to the trust circle 110 to cluster the aggregated data (e.g., ratings) automatically based upon various parameters such as age, location, hobbies, education, etc.

In an embodiment, when a user, for example user registered with the subscribed website 120, raises query through the subscribed website 120, the user's information is read, e.g., through the tenant database 140. Using the users OAuth token, user's information (e.g., connections and friend list) is retrieved from the social media websites (e.g., SMW 310-330 of FIG. 3). Based upon the query, the aggregated data (review, rating, etc.) related to the product or services specified in the query is retrieved. The relationship of the reviewers and the user is determined. Once the aggregated data (review/rating related to the product/service specified in the query), relationship between the reviewers and the user raising the query, and the clustered information related to the product/service specified in the query are retrieved, the trust circle 110 generates an output. The output displays details of product/service for which the query is raised, the aggregated data (review/rating related to the product/service specified in the query) along with relationship of the reviewers with the user raising the query, and the clustered information related to the product/service specified in the query. The output is provided to the subscribed websites 120 to display the output to the user that raised the query.

Figure 5:
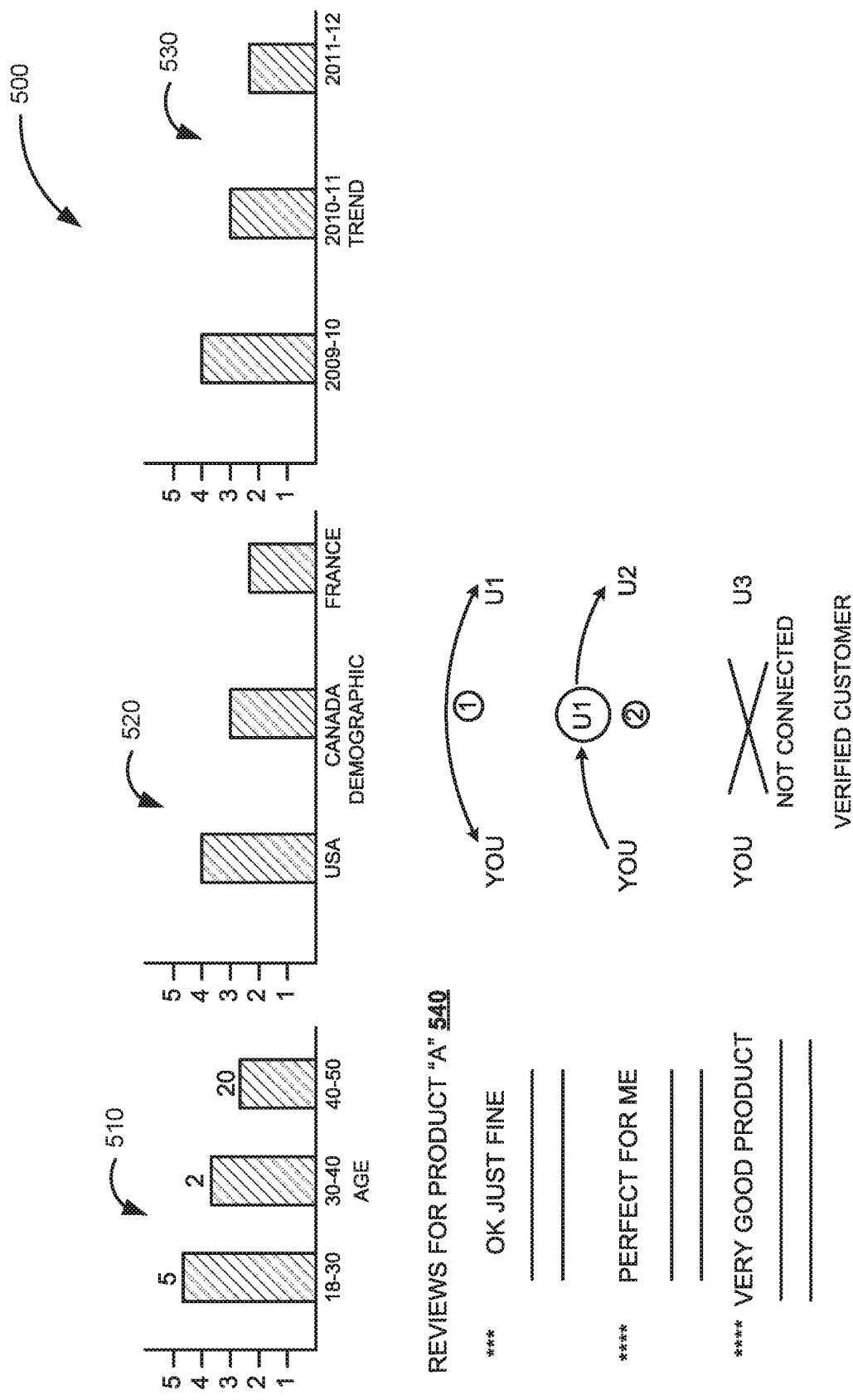
FIG. 5 illustrates an output generated by the trust circle, according to an embodiment.

FIG. 5 illustrates an exemplarily output 500 generated by the trust circle 110. The output 500 is generated based upon a query raised by a user through the subscribed website. The query may be related to retrieve review and ratings related to a product "A." The output 500 comprises various clustered data illustrated as graph 510-530 related to the product A, e.g., rating clustered based upon age (shown as graph 510), rating clustered based upon demography (shown as graph 520), and rating clustered based upon trend (shown as graph 530). As shown, as per 'rating clustered based upon age' or the graph 510, there are 5 reviewers in age group 18-30 who have given highest rating (e.g., 4.5 out of 5) for the product A, the product A is given higher ratings in USA than in Canada and France (as per 'rating clustered based upon demography' or the graph 520), and trend for the product is decreasing (as per 'rating clustered based upon trend' or the graph 530). Therefore, the ratings clustered based upon various parameters in graphical format helps user to quickly and efficiently analyze and rate the product, based upon their requirements. Further, the output 500 includes reviews for the product A 540 by reviewers. The reviews are displayed along with the relationship or connection of the user raised the query with the reviewers. For example, as shown, the review or rating by user U1 is "3 stars" and the user U1 is directly connected to the user, i.e., one-to-one connection. In an embodiment, along with connection it may also be shown through which social media website(s) the user and the reviewer are connected, e.g., Facebook®, etc. Similarly, the review or rating by user U2 is "4 stars" and the user U2 is indirectly connected to the user through the reviewer U1, i.e., level '2' connection. In an embodiment, the reviews may be prioritized or displayed based upon 'level of connection,' e.g., from low level to high level, i.e., level 1 connections are displayed prior to level 2 or 3 connections, etc. When the reviewer is not connected to the user on any level, then 'no connection' message is displayed. It may also be displayed that the unconnected reviewer is a verified user. For example, the review or rating by user U3 is "4 stars," however the user U3 is not connected to the user on any level, i.e., there is not any common connection on any level. The output 500 is sent to the subscribed website and displayed to the user who raised the query. Therefore, the output or reply provided to the user's query is more detailed, informative, and trustworthy.

Figure 6:
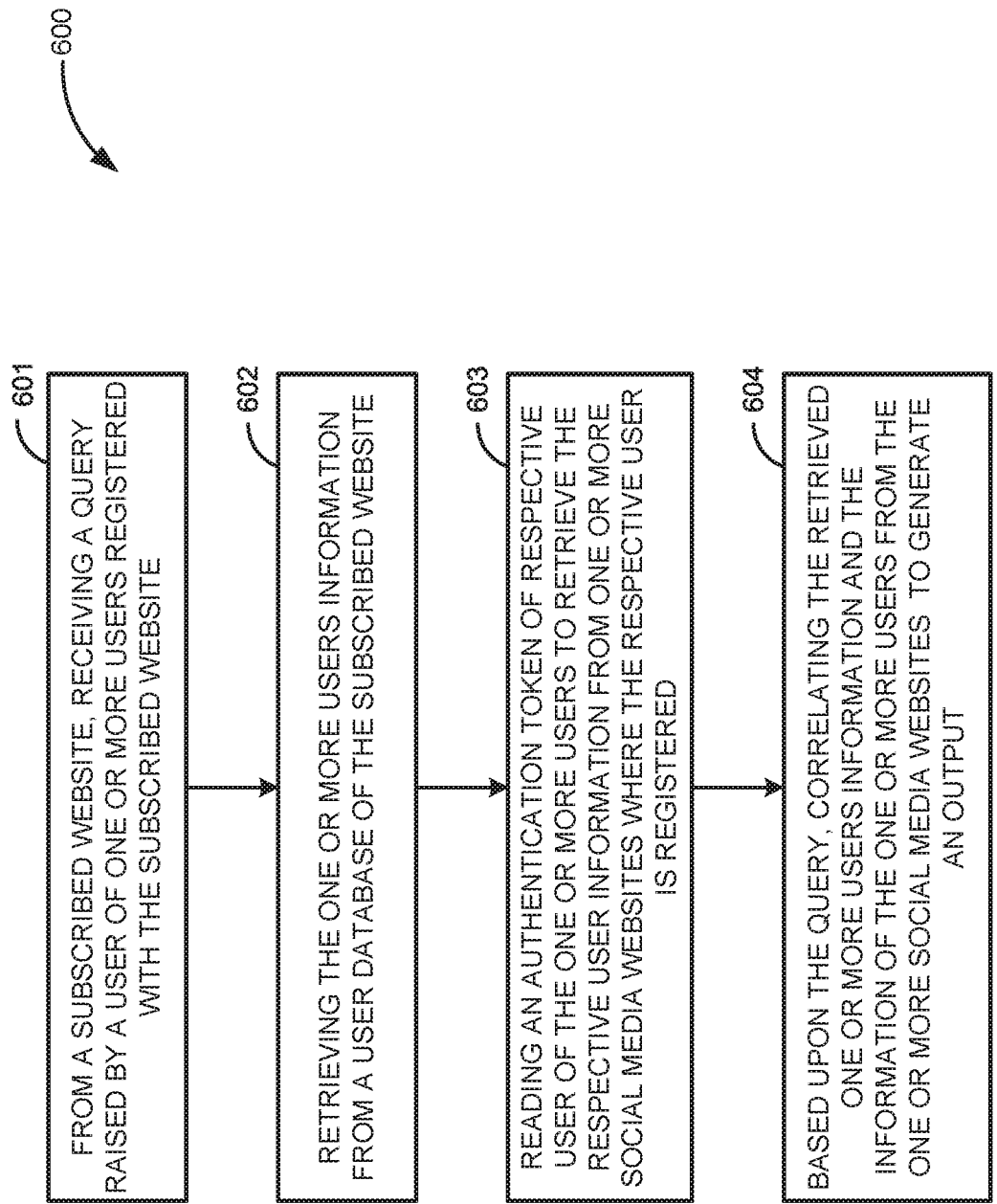
FIG. 6 is a flowchart illustrating a process of providing aggregated data to websites based upon a query, according to an embodiment.

FIG. 6 is a flowchart illustrating a process 600 to provide aggregated data to websites based upon a query, according to an embodiment. The website is required to be subscribed to trust circle (e.g., trust circle 110 of FIG. 1) to consume the consulting service, e.g., retrieve aggregated data based upon a query or as per user's request. The website subscribed for the consulting service or receiving aggregated data (e.g., the website 120 of FIG. 1) is identified. At 601, a query is received from the subscribed website. The received query may be raised by a user of one or more users registered with the subscribed website. At 602, the one or more users' information is retrieved from a user database (e.g., the user database 130 of FIG. 1) of the subscribed website. At 603, an authentication token of respective user of the one or more users is read to retrieve the respective user information from one or more social media websites where the respective user is registered. At 604, based upon the query, the retrieved one or more users information and the information of the one or more users from the one or more social media websites are correlated to generate an output (e.g., the output 500 of FIG. 5).

Embodiments provide effective, efficient, and reliable consulting or output, based upon user's query. The output comprises aggregated data including information of data sources (e.g., reviewers) and the relationship/connection of the data sources with the user requesting the aggregated data or raised the query. As the user (probable buyer or customer) is aware of the data sources and their connection with the data sources, therefore, there is trust on the output or aggregated data (e.g., reviews, feedback, ratings, answers, etc.) related to any product and/or services. Further, a collective, aggregated, compiled and trustworthy data or output is provided at a single place, therefore, the user does not need to spend time and effort in research and searching through various platforms and channels. Typically, the user gets feedback, reviews, or recommendation from its network or connections which boosts the user's confidence and enhances satisfaction level for making decision regarding any product or services. Additionally, as a search engine, the users are provided options to filter the data based upon various parameters such as interest, hobbies, demography, location, gender, etc. Further, the ratings are clustered based upon stated parameters and displayed graphically along with the reviews displayed based upon the connections or level of connection of the user with the reviewers. Also, as the data or output provided is trustworthy, users can easily and quickly take decisions and therefore, the sales or demand may increase which positively affects the service providers. Embodiments may be realized as a search engine app for end users and may be used as a plug-in for existing system, e.g., ecommerce websites, to enhance websites trustworthiness and reliability.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs. DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
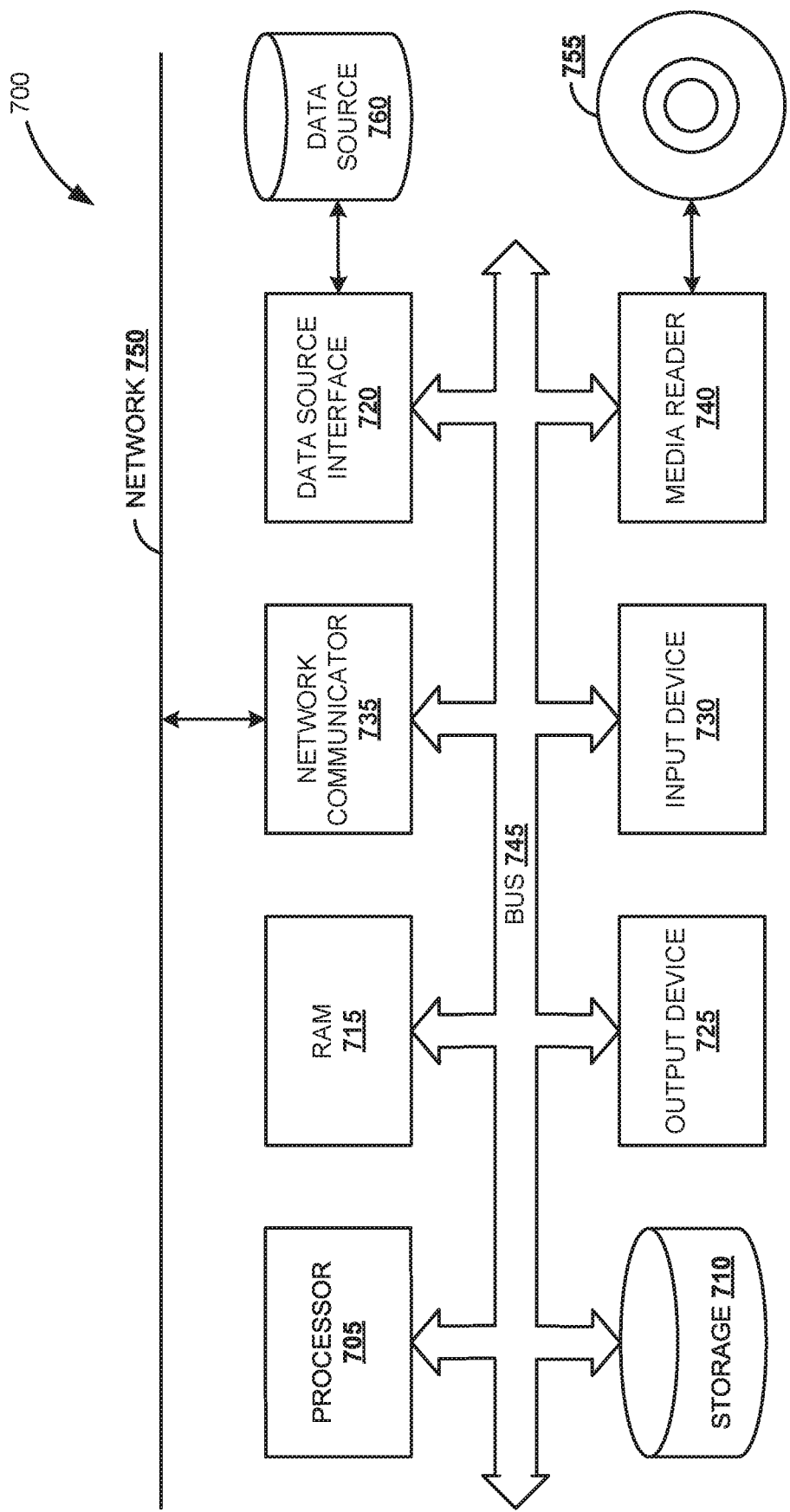
FIG. 7 is a block diagram illustrating an exemplary computer system, according to an embodiment.

FIG. 7 is a block diagram of an exemplary computer system 700. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. The output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable medium to store instructions, which when executed by a computer, causes the computer to:
   receive, via a host platform, approval to use social networking data from a plurality of users who participate in providing review content to a search website;
   receive a query of a user for an item via a plug-in incorporated within with the search website, the plug-in being hosted by the host platform;
   read, from a tenant database of the host platform, authentication tokens of the plurality of users of the search website who have approved of use of their social networking data;
   extract, via at least one application programming interface (API), social relationship information of the plurality of users of the search website from at least one social networking website that is hosted independently from the search website based on the authentication tokens of the plurality of users of the search website;
   determine via one or more machine learning models, direct and indirect connections between the plurality of users based on the social relationship information that is extracted from the at least one social network website:
   generate a graph database identifying the determined direct and indirect connections between the plurality of users
   identify, from the graph database, review content associated with the item on the search website and posted by one or more contacts socially connected to the user via the at least one social networking website based on determined direct and indirect connections of the one or more contacts with respect to the user
   generate query results including the identified review content posted by the one or more determined contacts that are socially connected to the user; and
   output the generated query results for display via the plug-in incorporated within the search website.

2. The non-transitory computer readable medium of claim 1, wherein the extracted social relationship information comprises at least one of a name of a contact, an age of the contact, an address of the contact, a contact number of the contact, and a location of the contact.

3. The non-transitory computer readable medium of claim 1, wherein the review content comprises at least one of:
   details of a product or service of the item in the query;
   replies and ratings for the item by one or more contacts; and
   ratings of the item clustered based upon at least one of an age of the one or more contacts, location of the one or more contacts, and gender of the one or more contacts.

4. The non-transitory computer readable medium of claim 1, wherein the identified social connection between a contact that created review content and the user includes at least one of:
   a level of connection of the contact with the user, wherein the level of connection indicates a direct connection or an indirect connection through one or more common contacts; and
   a name of one or more social media websites through which the contact and the user are connected.

5. The non-transitory computer readable medium of claim 1, wherein the executed instructions are further configured to cause the computer to:
   based upon permission from the plurality of users, store user information and the respective authentication tokens of the plurality of users into the tenant database.

6. The non-transitory computer readable medium of claim 1, wherein the extracted social relationship information comprises a friend list of the user.

7. The non-transitory computer readable medium of claim 1, wherein the social relationship information of the plurality of users is extracted from the at least one social networking website based on a plurality of OAuth tokens previously provided by the plurality of users via the search website.

8. A computer-implemented method comprising:
   receiving, via a host platform, approval to use social networking data from a plurality of users who participate in providing review content to a search web site;
   receiving a query of a user for an item via a plug-in incorporated within with the search website, the plug-in being hosted by the host platform;
   reading, from a tenant database of the host platform, authentication tokens of the plurality of users of the search website who have approved of use of their social networking data;
   extracting, via at least one application programming interface (API), social relationship information of the plurality of users of the search web site from at least one social networking website that is independent from the search website;
   determining, via one or more machine learning models, direct and indirect connections between the plurality of users based on the social relationship information that is extracted from the at least one social network website:
   generating a graph database identifying the determined direct and indirect connections between the plurality of users;
   identifying, from the graph database, review content associated with the item on the search website posted by one or more contacts socially connected to the user via the at least one social networking website based on determined direct and indirect connections of the one or more contacts with respect to the user; and generate query results including the identified review content posted by the one or more determined contacts that are socially connected to the user; and output the generated query results for display via the plug-in incorporated within the search website.

9. The method of claim 8 further comprising: creating a tenant database corresponding to the search website; and based upon permission from the user, storing user information and a respective authentication token of the user into the tenant database.

10. The method of claim 8, wherein the review content comprises at least one of:

details of a product or service of the item included in the query; replies and ratings for the item by one or more contacts; and ratings of the item clustered based upon at least one of age of the one or more contacts location of the one or more contacts, and gender of the one or more contacts.

11. The method of claim 8, wherein the identified social connection between a contact that created the review content and the user includes at least one of:

a level of connection of the contact with the user, wherein the level of connection indicates a direct connection or an indirect connection through one or more common contacts; and a name of one or more social media websites through which the contact and the user are connected.

12. A computer system comprising: at least one memory to store executable instructions; and at least one processor communicatively coupled to the at least one memory, the at least one processor configured to execute the executable instructions to:

receive, via a host platform, approval to use social networking data from a plurality of users who participate in providing review content to a search web site;

receive a query of a user for an item via a plug-in incorporated within with the search website, the plug-in being hosted by the host platform;

read, from a tenant database of the host platform, authentication tokens of the plurality of users of the search website who have approved of use of their social networking data;

extract, via at least one application programming interface (API), social relationship information of the plurality of users of the search website from at least one social networking website that is hosted independently from the search website based on the authentication tokens of the plurality of users of the search website;

determine, via one or more machine learning models, direct and indirect connections between the plurality of users based on the social relationship information that is extracted from the at least one social network website;

generate a graph database identifying the determined direct and indirect connections between the plurality of users;

identify, from the graph database, review content associated with the item on the search website and posted by one or more contacts socially connected to the user via the at least one social networking website based on determined direct and indirect connections of the one or more contacts with respect to the user;

generate query results including the identified review content posted by the one or more determined contacts that are socially connected to the user; and output the generated query results for display via the plug-in incorporated within the search website.

13. The system of claim 12, wherein the processor is further configured to:

based upon permission of the plurality of users, store user information and the respective authentication tokens of the plurality of users into the tenant database.

14. The system of claim 12, wherein the extracted social relationship information comprises at least one of a name of a contact, an age of the contact, address of the contact, contact number of the contact, and location of the contact.

15. The system of claim 12, wherein the extracted social relationship information comprises a friend list of the user.

16. The system of claim 12, wherein the review content comprises at least one of:

details of a product or service of the item in the query;

replies and ratings for the item by one or more contacts; and ratings of the item clustered based upon at least one of age of the one or more contacts, location of the one or more contacts, and gender of the one or more contacts.

17. The system of claim 12, wherein the identified social connection between a contact that created the review content and the user includes at least one of:

a level of connection of the contact with the user, wherein the level of connection indicates a direct connection or an indirect connection through one or more common contacts; and a name of one or more social media websites through which the contact and the user are connected.

18. The system of claim 12, wherein the social relationship information of the plurality of users is extracted from the at least one social networking website based on a plurality of OAuth tokens previously provided by the plurality of users via the search website.

19. The non-transitory computer readable medium of claim 1, wherein the generated query results comprise a plurality of pieces of content which are arranged in an order based on different types of social connections between the user and contacts that created the respective pieces of content.

20. The non-transitory computer readable medium of claim 1, wherein the instructions cause the computer to input the social relationship information that is extracted from the at least one social network website into a K-nearest neighbors algorithm to determine the direct and indirect connections between the plurality of users.

* * * * *